(12) United States Patent
Wu et al.

(10) Patent No.: US 7,794,829 B2
(45) Date of Patent: Sep. 14, 2010

(54) REFLECTOR HAVING HIGH LIGHT DIFFUSION

(75) Inventors: Tu-Yi Wu, Kaohsiung (TW); Lung-Lin Hsu, Kaohsiung (TW); Chia-Yi Lu, Kaohsiung (TW); Yung-Ming She, Kaohsiung (TW)

(73) Assignee: Eternal Chemical Co., Ltd., Taiwan (CN)

( * ) Notice: Subject to any disclaimer, the term of this patent is extended or adjusted under 35 U.S.C. 154(b) by 27 days.

(21) Appl. No.: 11/513,472

(22) Filed: Aug. 31, 2006

(65) Prior Publication Data

US 2007/0048499 A1 Mar. 1, 2007

(30) Foreign Application Priority Data

Aug. 31, 2005 (TW) .............................. 94129993 A

(51) Int. Cl.
*B32B 5/16* (2006.01)
*B32B 27/38* (2006.01)
*B32B 27/00* (2006.01)
*B32B 27/06* (2006.01)
*B32B 27/36* (2006.01)

(52) U.S. Cl. .................. 428/323; 428/327; 428/328; 428/329; 428/330; 428/331; 428/413; 428/421; 428/423.1; 428/423.7; 428/473.5; 428/474.4; 428/475.2; 428/480; 428/500

(58) Field of Classification Search .................. None
See application file for complete search history.

(56) References Cited

U.S. PATENT DOCUMENTS 6,166,793 A   12/2000   Hayashi et al.
6,649,260 B2  11/2003   Kumano et al.
6,683,720 B2   1/2004   Yoshida et al.
6,741,307 B2 *  5/2004  Matsunaga et al. .......... 349/112
6,882,388 B2   4/2005   Sugiura et al.
7,072,115 B2   7/2006   Uekita et al.
2005/0030630 A1 2/2005  Ohnishi et al.

FOREIGN PATENT DOCUMENTS

| CN | 1357453 | 7/2002 |
|---|---|---|
| CN | 1453596 | 11/2003 |
| JP | H11-237506 A | 8/1999 |
| JP | 2002-194290 A | 7/2002 |
| JP | 2003-302629 A | 10/2003 |
| JP | 2004-126345 A | 4/2004 |
| JP | 2005-148515 A | 6/2005 |
| KR | 2002-62799 | 7/2002 |
| KR | 2003-0044807 | 6/2003 |
| TW | 1235866 | 6/1993 |
| TW | 583465 | 4/2004 |
| WO | 03/032073 A1 | 4/2003 |

OTHER PUBLICATIONS espacenet English abstract of WO 03/032073 A1.
espacenet English abstract of JP 2004-126345 A.
espacenet English abstract of JP 2005-148515 A.
Patent Abstracts of Japan English abstract of JP 11-237506 A.
Patent Abstracts of Japan English abstract of JP 2002-194290 A.
Patent Abstracts of Japan English abstract of JP 2003-302629 A.

* cited by examiner

*Primary Examiner*—Sheeba Ahmed
(74) *Attorney, Agent, or Firm*—Ladas and Parry LLP

(57) ABSTRACT

The invention pertains to a reflector comprising a substrate capable of reflecting light, characterized in that the reflector exhibits a gloss of less than 10% as determined when a light source is projected on the surface of the reflector at 60 degree.

The reflector of the invention allows the light to be reflected uniformly and possesses a high reflectivity.

13 Claims, 4 Drawing Sheets

REFLECTOR HAVING HIGH LIGHT DIFFUSION

BACKGROUND OF THE INVENTION

1. Field of Invention

The present invention relates to a reflector capable of reflecting light uniformly and enhancing brightness. Particularly, the invention pertains to a light diffusion reflector, which can be used in liquid crystal displays.

2. Description of the Prior Art

It is important to utilize a backlight source as an essential element for the displaying function and the brightness source of liquid crystal displays (LCDS) for enhancing the displaying brightness of the LCDs. Before the present invention, many methods associated with the modifications of the backlight source for improving the displaying brightness of LCDs have been proposed. For example, it has been proposed to improve the displaying brightness by increasing the number of the lamps and/or increasing the power of the lamps. Nevertheless, this approach would suffer the drawbacks associated with bulkiness and electricity-wasting problems.

An excellent reflector can enhance the brightness entirely, without narrowing the viewing angle. According to a real test, if the reflectivity of a module increases by 3-5%, the brightness of the same module at the same conditions will increase by 8-10%.

Moreover, the LCD product has been expanded from LCDs in laptop computers or LCD screens to LCD TVs. Thus, critical factors to be considered are sufficient imaging luminance, broad viewing angle, sharp image contrast, and desired service life. In order to meet the requirements, a direct type backlight has become the mainstream technology used in large LCD TVs. FIG. 1 is a schematic view of a direct type backlight module.

Though the direct type backlight module product usually provides a high luminance, bright and dark stripes easily occur due to the increase in the number of the lamps, and thereby the uniformity of light is influenced. In addition, the surface of a general reflector is planar, and when the incidence angle of light deviates from the normal, the reflected light will also deviate from the normal, thereby resulting in insufficient front-face brightness.

One approach to overcome the above drawbacks is to utilize a light diffusion plate. For example, JP 2000-11886 discloses etching metal on the surface of a glass substrate so as to obtain a reflector having a textured and convex-concave surface. In order to avoid the contact of the back surface of the glass substrate with the etching solution, the glass substrate should be protected, which renders the manufacturing process more complex and increases the difficulty in post-treating the etching solution.

Moreover, it has also been proposed to form a film having a convex-concave structure on the metal with a photosensitive resin by a mask lithography technique, so as to form a diffusion reflection film. However, the manufacturing process involving mask lithography is more expensive and not easy to be controlled.

After a wide range of research, it has been found that the above drawbacks can be overcome by directly applying a convex-concave structured film onto the surface of a reflector. Such a manufacturing process is simple and easy to be controlled, and may enhance the adhesion to the substrate.

SUMMARY OF THE INVENTION

The main object of the present invention is to provide a high light diffusion reflector comprising a substrate capable of reflecting light, characterized in that the reflector exhibits a gloss of less than 10% as determined according to ASTM D523 standard method at an incidence angel of 60 degree.

DETAILED DESCRIPTION OF THE INVENTION

Figure 1:
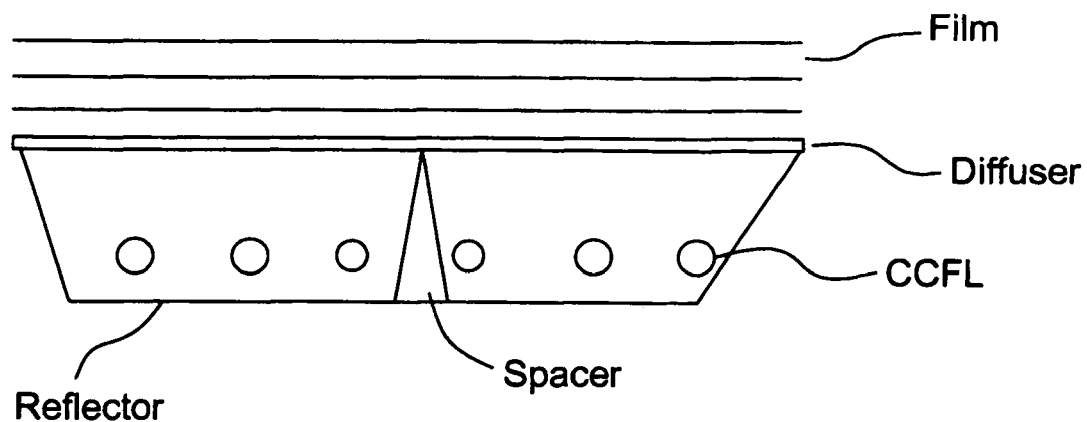
FIG. 1 is a schematic view of a direct type backlight module.
Figure 2:
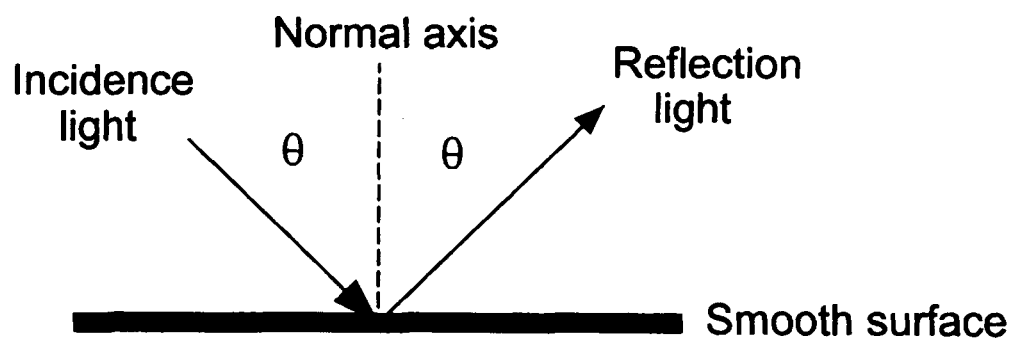
FIG. 2 shows a specular reflection.
Figure 3:
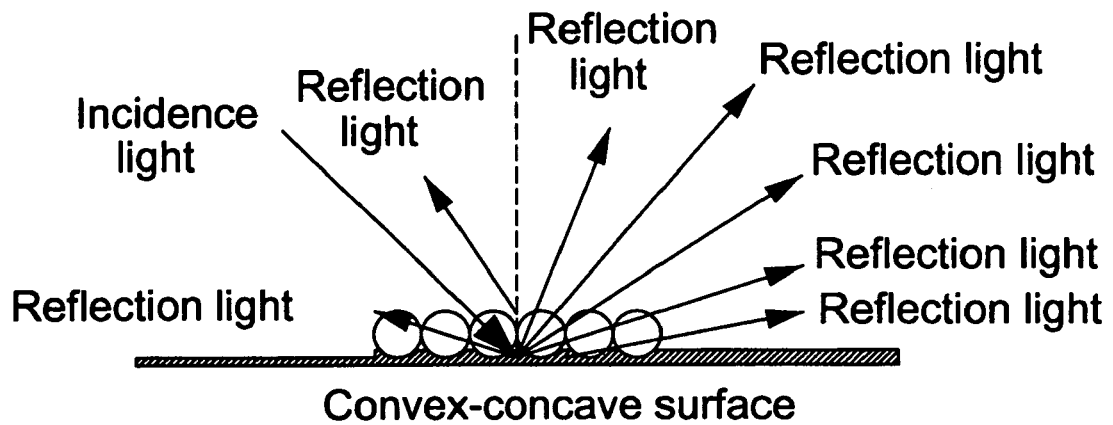
FIG. 3 shows a diffuse reflection.

Due to the various surface structures, articles reflect light in different manners. The reflections of light include specular reflection and diffuse reflection. As shown in FIG. 2, when the light projects on a hard article with a smooth surface, the light reflects regularly and such reflection is called specular reflection. As shown in FIG. 3, when the light projects on an article with a rough surface, the light reflects irregularly and such reflection is called diffuse rejection.

In order to obtain a diffuse reflection effect, the reflector according to the present invention has a convex-concave microstructure on at least one surface of the substrate. The process for forming the convex-concave structure is not particularly limited, and may be any of those well known to those skilled in the art. A preferred method is to apply a resin-coating layer with a convex-concave structure on the surface of the substrate. The above resin-coating layer comprises particles with a diameter in the range from 1 μm to 50 μm and a binder. In order to achieve a high diffusion effect, the amount of the particles preferably is in the range from about 10 to 200 weight %, based on the weight of the binder, and more preferably, in the range form 30 to 60 weight %. If the amount of the particles is lower than 10 weight %, based on the weight of the binder, the diffusion effect is not desirable, whereas if the amount of the particles is higher than 20 weight %, the particles are difficult to be fixed into the binder on the surface of the substrate, which is likely to result in the risk of the dropping-out of the particles. The particles that can be used in the present invention are not particularly limited, and can be organic particles, inorganic particles, or a mixture thereof. The shape of the particles is also not particularly limited, and can be spherical or diamond-shaped.

The organic particles used in the present invention can be selected from the group consisting of acrylic resin, styrene resin, urethane resin, silicone resin, and a mixture thereof.

The inorganic particles used in the present invention can be selected from the group consisting of zinc oxide, silicon dioxide, titanium dioxide, zirconia, aluminium oxide, zinc sulfide, barium sulfate, and a mixture thereof.

According to one embodiment of the present invention, the above particles are preferably organic particles with a particle size in the range from 1 μm to 10 μm. Preferably, the organic particles are silicone resin particles.

The above binder is not particular limited, and can be, for example, selected from the group consisting of acrylic resin, polyamide resin, epoxy resin, fluoro resin, polyimide resin, polyurethane resin, alkyd resin, polyester resin, and a mixture thereof, of which acrylic resin, polyurethane resin, polyester resin, and a mixture thereof are preferred. The binder used in the present invention preferably is colorless and transparent such that light can transmit therethrough.

The substrate of the reflector according to the present invention is not particularly limited and can be transparent, translucent, or opaque. Typically, the substrate comprises at least one layer of a polymeric resin. The polymeric resin does not require particular limitations. Examples of suitable polymeric resins include, but are not limited to polyolefin resins, such polyethylene (PE) or polypropylene (PP); polyester resins, such as polyethylene terephthalate; polyacrylate resins, such as poly(methyl methacrylate) (PMMA); polycarbonate resins; and polyurethane resins; and a mixture thereof. According to one embodiment of the invention, the inventive reflector comprises a substrate of a polyester resin, preferably, polyethylene terephthalate. The substrate used in the invention may optionally contain the inorganic particulates that are well known to persons skilled in the art, such as zinc oxide, silicon dioxide, titanium dioxide, aluminium oxide, calcium sulfate, barium sulfate, and calcium carbonate, and a mixture thereof, among which titanium dioxide and barium sulfate are preferred. The reflection effect of the inventive reflector is achieved by utilizing a foamed polymeric resin or inorganic particles. The substrate used in the present invention can be a multi-layered substrate wherein the intermediate layer contains said polymeric resin, either foamed or unfoamed, or the intermediate layer contains the inorganic particles.

The coating layer with a convex-concave microstructure on the reflector of the invention normally has a thickness in the range from 1 to 50 μm, preferably, from 2 to 15 μm. In order to avoid the yellowing of the polymeric resin, thereby weakening the reflection effect and resulting in a color-difference problem associated with liquid crystal displays, an inorganic substance capable of absorbing UV light is optionally added to the coating layer. Suitable species of the inorganic substance do not require any particular limitations, which are, for example, but not limited to, zinc oxide, lead oxide, aluminium oxide, silicon dioxide, titanium dioxide, calcium sulfate, barium sulfate, calcium carbonate, or a mixture thereof. The particle size of the above inorganic substance is generally in the range from 1 nm to 100 nm, preferably in the range from 20 nm to 50 nm.

The coating layer on the substrate of the inventive reflector may contain additives known to those skilled in the art, which are, for example, but not limited to, a leveling agent, a stabilizing agent, a curing agent, a fluorescent brightness enhancer, or an UV-absorbing agent.

The curing agent that can be used in the present invention to form a crosslinking with the bonding agent through the chemical bonding between the molecules is well known to those skilled in the art, which is, for example, but not limited to polyisocyanate.

The fluorescent brightness enhancer that can be used in the present invention is not particularly limited and is obvious to those skilled in the art, which can be an organic substance, including but being not limited to benzoxazoles, benzimidazoles, or diphenylethylene bistriazines; or an inorganic substance, including but being not limited to zinc sulfide.

The UV-absorbing agent that can be used in the present invention is well known to those skilled in the art, examples of which include benzotriazoles, benzotriazines, benzophenones, or salicylic acid derivatives.

The reflector of the present invention can provide a reflectivity of more than 97% in the visible wavelength range from 400 μm to 780 μm, and thus can effectively enhance the brightness of backlight modules.

Figure 4:
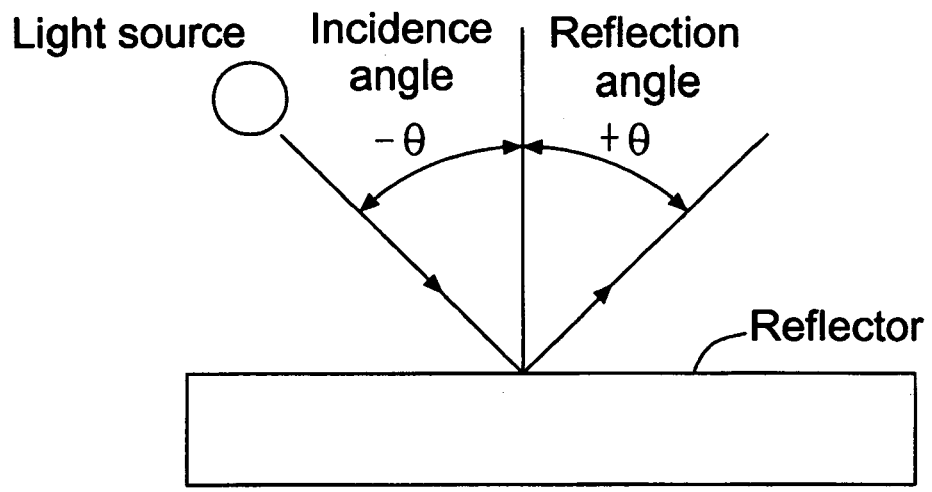
FIG. 4 shows the incidence angle and reflection angle of light relative to a reflector.

"Gloss" is the visualization property for evaluating whether the surface of an article is smooth or not. If the surface of an article reflects more light, the gloss of the article will be more significant. As shown in FIG. 4, when the light source projects with an incidence angle of 60°, the gloss of the surface with the convex-concave microstructure, as measured according to a ASTM D523 standard method, is lower than 10%.

Figure 5A:
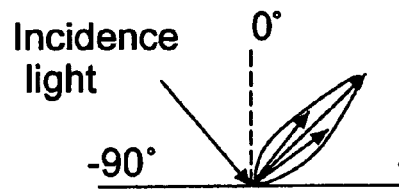
FIG. 5a represents a luminance map of a specular reflection determined by a goniophotometer.
Figure 5B:
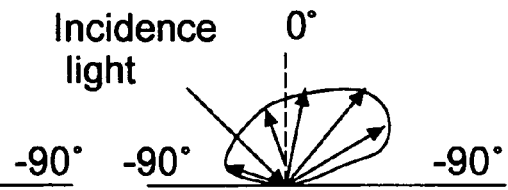
FIG. 5b represents a luminance map of a diffuse reflection determined by a goniophotometer.

The reflector of the present invention exhibits a good light diffusion effect as evidenced by the distribution of the reflectivity parameters measured by a goniophotometer. As shown in FIG. 5a, for a general article having an almost smooth surface, a stronger reflection in the specular direction will be obtained. However, as shown in FIG. 5b, for the reflector of the present invention, the light rays diffusively reflect off from various directions due to the convex-concave surface structure of the reflector.

The reflector of the present invention has good weathering property, is effective in absorbing UV light, and is able to reflect light diffusively so as to obtain uniform viewing angles. Therefore, the inventive reflector is suitable for use as a light diffusion reflector in a backlight module, particularly, in a direct type backlight module, of a flat display. Since the reflector has a high diffusion property, the light can be uniformly diffused, thereby eliminating the bright and dark stripes and achieving a uniform light effect.

The following examples are intended to further describe the present invention, but not to limit the scope of the present invention. Any modifications and variations easily achieved by those skilled in the art are included in the scope of disclosures of the specification and appended claims.

EXAMPLES

Example 1

Figure 6:
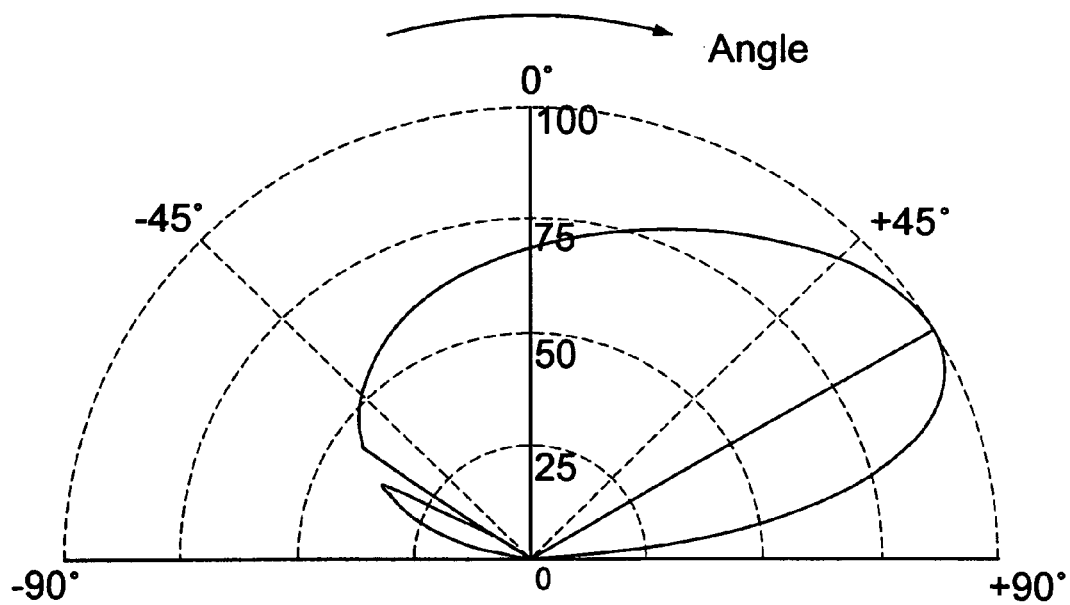
FIG. 6 shows a luminance map at an incidence angle of 60° determined according to Example 1.
Figure 7:
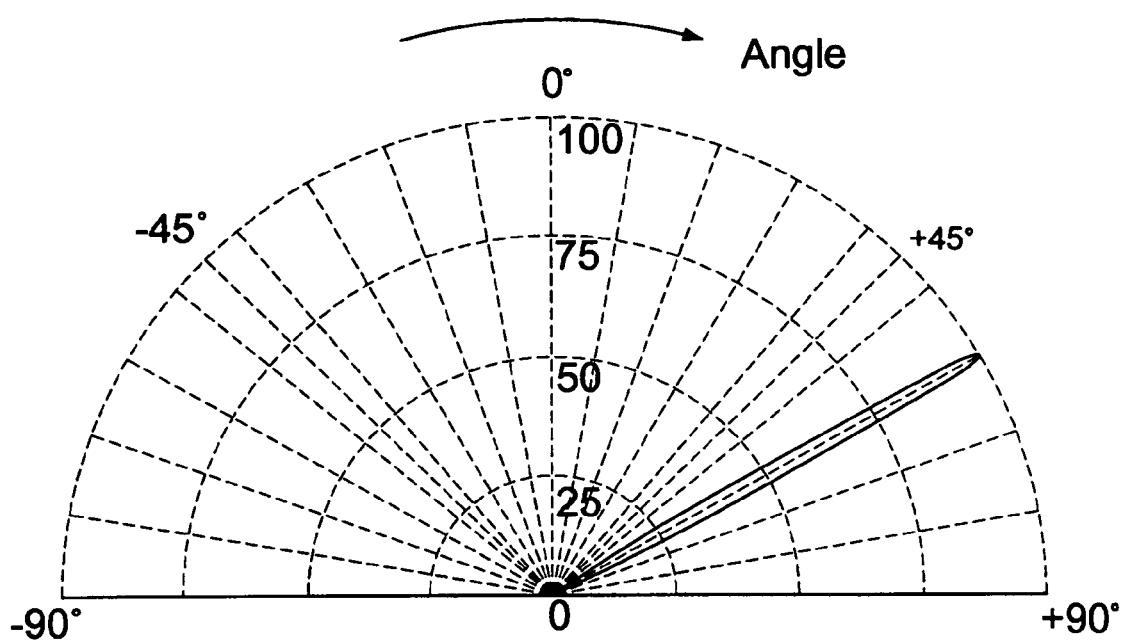
FIG. 7 shows a luminance map at an incidence angle of 60° determined according to Comparative Example 5.

68.1 g acrylic resin [Eterac 7363-ts-50, Eternal Company] (with a solids content of about 50%) was added into a plastic bottle. Then, 52.0 g methyl ethyl ketone, 52.0 g toluene, 50.0 g silicone resin powder with an average particle size of 24 μm [Tospearl 145, GE Toshiba Silicones Company], 10.0 g 1-100 nm zinc oxide/titanium dioxide/barium sulfate, and 6.6 g curing agent [Desmodur 3390, Bayer Company] were added sequentially under a high-speed stirring. As such, a coating with a solids content of about 40% and a total weight of about 250.0 g was obtained. The coating was coated onto a UX-150 (from Teijin) substrate. After drying, a 10 μm coating film was obtained. After standing for 7 days, the film was subjected to a weathering test (utilizing QUV accelerated weathering tester from Q-panel Company). The results of the test are shown in Table 1 below. Moreover, as shown in FIG. 6, the luminance of the coated substrate was also determined.

Example 2

The procedure of Example 1 was repeated, with the exception that the substrate UX-150 (from Teijin) was replaced by the E60L substrate (from Toray). The results of the test are shown in Table 1 below.

Comparative Example 1

145.9 g acrylic resin [Eterac 7363-ts-50, Eternal Company] (with a solids content of about 50%) was added into a plastic bottle. Then, 38.0 g methyl ethyl ketone, 38.0 g toluene, 10.0 g 1-100 nm zinc oxide/titanium dioxide/barium sulfate, and 14.1 g curing agent [Desmodur 3390, Bayer Company] were added sequentially under a high-speed stirring. As such, a coating with a solids content of about 40% and a total weight of about 250.0 g was obtained. The coating was coated onto a UX-150 (from Teijin) substrate. After drying, a 10 μm coating film was obtained. After standing for 7 days, the film was subjected to tests on physical properties. The results of the tests are shown in Table 1 below.

Comparative Example 2

The procedure of Comparative Example 1 was repeated, with the exception that the substrate UX-150 (from Teijin) was replaced by the E60L substrate (from Toray). The results of the tests are shown in Table 1 below.

Comparative Example 3

68.1 g acrylic resin [Eterac 7363-ts-50, Eternal Company] (with a solids content of about 50%) was added into a plastic bottle. Then, 52.0 g methyl ethyl ketone, 52.0 g toluene, and 50.0 g silicone resin powder [Tospearl 145, GE Toshiba Silicones Company] were added sequentially under a high-speed stirring. Thereafter, 6.6 g curing agent [Desmodur 3390, Bayer Company] was added. As such, a coating with a solids content of about 40% and a total weight of about 250.0 g was obtained. The coating was coated onto a UX-150 (from Teijin) substrate. After drying, a 10 μm coating film was obtained. After standing for 7 days, the film was subjected to a weathering test (utilizing QUV accelerated weathering tester from Q-panel Company). The results of the test are shown in Table 1 below.

Comparative Example 4

The procedure of Comparative Example 3 was repeated, with the exception that the substrate UX-150 (from Teijin) was replaced by the E60L substrate (from Toray). The results of the tests are shown in Table 1 below.

Comparative Example 5

A UX-150 (from Teijin) substrate without a coating layer having a convex-concave microstructure and containing inorganic particles was directly subjected to a weathering test (utilizing QUV weathering tester from Q-panel Company). The results of the test are shown in Table 1 below. Moreover, as shown in FIG. 6, the luminance of the substrate was also determined.

Comparative Example 6

The procedure of Comparative Example 5 was repeated, with the exception that the substrate UX-150 (from Teijin) was replaced by the E60L substrate (from Toray). The results of the tests are shown in Table 1 below.

Test Method:

Gloss test: measuring the gloss in percentage according to ASTM D523 standard method at an incidence angel of 60 degree by Drlange Rrfo3 (commercially available from Reflek TO Meter Company).

QUV accelerated weathering test: measuring the yellowing index (YI) values varying with the exposure time [at the main test wavelength: 313 nm] by a QUV weathering tester (from Q-panel Company).

Luminance: measuring the distribution of the reflected light intensities at various reflection angles by a goniophotometer [GP-200, Murakami Color Research Laboratory] at an incidence angle of 60 degrees.

TABLE 1

|  | Gloss 60°% | Rf % | ΔYI 300 hr |
|---|---|---|---|
| Example 1 | 4.6 | 97.8 | 1.43 |
| Example 2 | 3.8 | 97.6 | 1.91 |
| Comparative Example 1 | 39.2 | 97.0 | 1.45 |
| Comparative Example 2 | 32.9 | 97.0 | 1.96 |
| Comparative Example 3 | 4.8 | 97.5 | 10.73 |
| Comparative Example 4 | 4.7 | 97.3 | 18.69 |
| Comparative Example 5 | 39.1 | 96.0 | 11.62 |
| Comparative Example 6 | 35.4 | 96.5 | 20.53 |

It is clear from the results of Example 1 and Example 2 that in the presence of a coating layer containing organic particles, which results in a convex-concave surface structure, the exemplified substrates have a light diffusion property. In addition, since the coating layer contains an inorganic substance capable of absorbing UV light, it provides a better anti-yellowing effect and imparts an anti-UV property to the substrate.

It is clear from the results of comparing Example 1 with Comparative Example 1 and Example 2 with Comparative Example 2 that in the absence of organic particles and thus a convex-concave surface structure, the coated substrates do not possess a light diffusion property.

It is clear from the results of comparing Example 1 with Comparative Example 2 and Example 2 with Comparative Example 4 that if the coating layer does not contain an inorganic substance, the coated substrate is susceptible to yellowing.

A comparison between the examples and comparative examples reveals that when a substrate is coated with a coating containing organic particles and thus having a convex-concave surface structure, and simultaneously containing an inorganic substance capable of absorbing UV light, the substrate will exhibit a better reflectivity and a higher brightness It is clear from comparing the luminance maps of Example 1 and Comparative Example 5 that if a substrate is coated with a coating layer having a convex-concave structure, it will exhibit a light diffusion property.

What is claimed is:

1. A reflector comprising:
    an opaque substrate that is capable of reflecting light and comprises at least one layer of a polymeric resin, in which the substrate is coated with a coating layer having a convex-concave micro-structure and containing particles with a diameter in the range of 1 μm to 50 μm and a binder, wherein the amount of the particles is in the range of 20 to 200 weight % based on the weight of the binder, and the reflector exhibits a gloss of less than 10% as determined according to an ASTM D523 standard method at an incidence angle of 60 degrees.

2. The reflector according to claim 1, wherein the particles are organic particles, inorganic particles, or a mixture thereof.

3. The reflector according to claim 2, wherein the organic particles are selected from the group consisting of acrylic resin, styrene resin, urethane resin, silicone resin, and a mixture thereof.

4. The reflector according to claim 2, wherein the inorganic particles are selected from the group consisting of zinc oxide, silicon dioxide, titanium dioxide, zirconia, aluminium oxide, zinc sulfide, barium sulfate, and a mixture thereof.

5. A reflector for use in a backlight module, comprising:
an opaque substrate that is capable of reflecting light and contains at least one layer of a polyester resin, in which the substrate is coated with a coating layer having a convex-concave micro-structure and containing particles with a diameter in the range of 1 μm to 50 μm and a binder, wherein the amount of the particles is in the range of 20 to 200 weight % based on the weight of the binder, and the reflector exhibits a reflectivity of greater than 97% in a visible wavelength range of 400 μm to 780 μm and a gloss of less than 10% as determined according to an ASTM D523 standard method at an incidence angle of 60 degrees.

6. The reflector according to claim 5, wherein the particles are organic particles.

7. The reflector according to claim 6, wherein the particles are selected from the group consisting of acrylic resin, styrene resin, urethane resin, silicone resin, and a mixture thereof.

8. A light diffusion reflector for use in a direct type backlight module, comprising:
a substrate that is capable of reflecting light and contains at least one layer of polyethylene terephthalate, in which the substrate is coated with a coating layer having a convex-concave micro-structure and containing organic particles with a diameter in the range of 1 μm to 50 μm and a binder, wherein the amount of the organic particles is in the range of 30 to 200 weight % based on the weight of the binder, and the reflector exhibits a reflectivity of greater than 97% in a visible wavelength range of 400 μm to 780 μm and a gloss of less than 10% as determined according to an ASTM D523 standard method at an incidence angle of 60 degrees.

9. The light diffusion reflector according to claim 8, wherein the organic particles have a diameter in the range of 1 μm to 10 μm.

10. The light diffusion reflector according to claim 9, wherein the organic particles are silicone resin particles.

11. The light diffusion reflector according to claim 8, wherein the binder is selected from the group consisting of acrylic resin, polyamide resin, epoxy resin, fluoro resin, polyimide resin, polyurethane resin, alkyd resin, polyester resin, and a mixture thereof.

12. The light diffusion reflector according to claim 8, wherein the amount of the organic particles is in the range of 30 to 60 weight % based on the weight of the binder.

13. The light diffusion reflector according to claim 8, wherein the coating further comprises inorganic substances.

* * * * *